United States Patent [19]

Brunner et al.

[11] 3,997,897
[45] Dec. 14, 1976

[54] RADAR SYSTEM WITH DISPLACED PRIMARY AND SECONDARY RADIATION LOBES

[75] Inventors: Anton Brunner, Wangen, Starnberg; Reinhard Bredow, Munich, both of Germany

[73] Assignee: Siemens Aktiengesellschaft, Berlin & Munich, Germany

[22] Filed: Oct. 23, 1974

[21] Appl. No.: 517,232

[30] Foreign Application Priority Data

Oct. 25, 1973  Germany .......................... 2353504

[52] U.S. Cl. .............................. 343/6 R; 343/6.5 R
[51] Int. Cl.² ............................................ G01S 9/56
[58] Field of Search ............ 343/6.5 R, 6.5 LC, 6 R

[56] References Cited

UNITED STATES PATENTS

| | | | |
|---|---|---|---|
| 3,618,086 | 11/1971 | Van Staaden et al. | 343/6 R X |
| 3,945,007 | 3/1976 | Radford | 343/6 R |

*Primary Examiner*—T.H. Tubbesing
*Attorney, Agent, or Firm*—Hill, Gross, Simpson, Van Santen, Steadman, Chiara & Simpson

[57] ABSTRACT

A radar system having a primary and a secondary radar device each generating respective radiation lobes with the primary radiation device having means for making contact with a target and a secondary radiation device producing a radiation lobe which is displaced from a radiation lobe of the primary device so that the secondary device makes contact with the target following the time delay consumed by the processing of the target echo by the receiver of the primary device.

11 Claims, 9 Drawing Figures

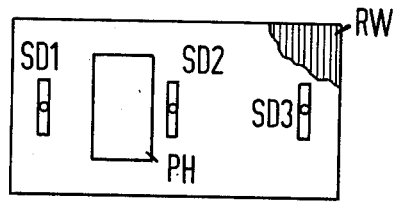
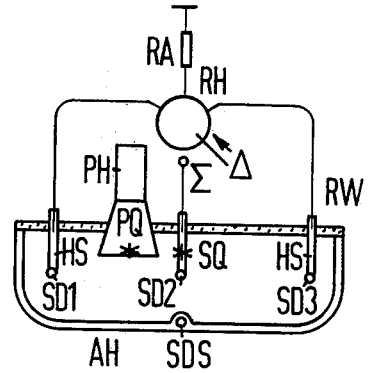
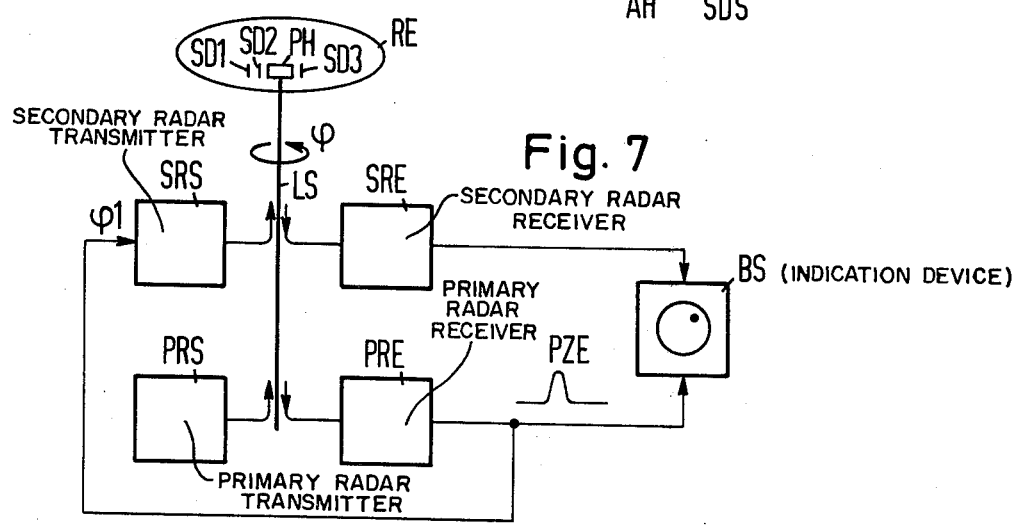
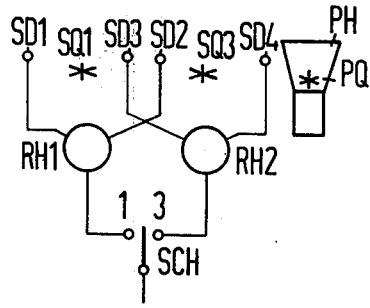
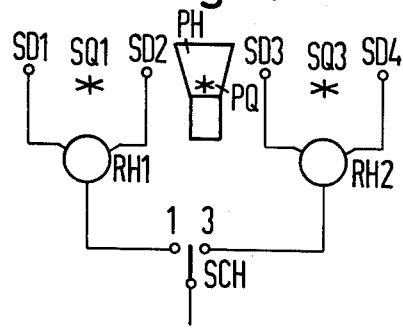

RADAR SYSTEM WITH DISPLACED PRIMARY AND SECONDARY RADIATION LOBES

BACKGROUND OF THE INVENTION

Rotating or swinging radar systems may have both primary and secondary radar devices which produce radiation lobes along the same axis. The result is that after the primary device has made contact with the target by receiving the target echo, it is no longer possible to send interrogation signals by the secondary radar device until the system has made another pass at the target. In the case of a rotating device this means a complete 360° additional revolution. Because of such systems, the load on the radar facility can become excessive. According to the present invention, contact by the secondary radar device is made immediately following receipt of the target echo by the primary radar device, thereby eliminating the load on the radar system.

SUMMARY OF THE INVENTION

It is an important feature of the present invention to provide an improved radar system.

It is another feature of the present invention to provide a radar system having a primary and secondary radar device wherein the secondary radar device is displaced in a direction opposed to the rotation of the system to provide more immediate contact with the target when detected.

It is a principle object of the present invention to provide a radar system as described above wherein the secondary radar device is displaced at aa given angle with respect to the primary radar device to compensate for the time lapse required for the processing of the target echo signal.

It is another object of the present invention to provide a radar system as described above wherein the angle of displacement of the secondary radar device is controlled electronically in accordance with the target distance and speed covered by the primary radar device.

It is an additional object of the present invention to provide a radar system as described above wherein the angle of displacement between the primary and secondary devices is accomplished by mechanical movement of the primary device relative to the secondary device.

It is also an object of the present invention to provide a secondary radar device for a radar system as described above which has two, three or four radiators, any pair of which may be connected by a hybrid ring to produce the desired displacement between the secondary and primary radiation lobes.

It is another object of the present invention to provide the desired displacement as described above by a switching of feed lines of various secondary radar devices.

These and other objects, features, and advantages of the present invention will be understood in greater detail from the following descripton and associated drawings wherein reference numerals are utilized to designate a preferred embodiment.

BRIEF DESCRIPTION OF THE DRAWINGS

FIG. 5 shows the exciter system of an integrated antenna arrangement.

FIG. 6 shows a top view of a system as shown in FIG. 5.

FIG. 7 shows a block diagram of a radar arrangement according to the invention.

FIGS. 8 and 9 show arrangements for changing the displacement angle in various manners.

DESCRIPTION OF THE PREFERRED EMBODIMENT

Figure 1:
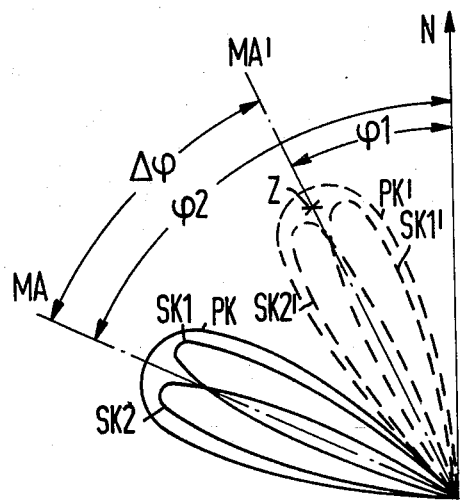
FIG. 1 shows a prior art arrangement wherein the radiation diagrams of the primary and secondary radar devices are aligned.

The present invention relates to a radar arrangement, consisting of a primary radar device and a secondary radar device with respective rotating or swingable antenna radiation lobes. The lobes are created by a first radiation arrangement assigned to the primary radar device and a second radiation arrangement assigned to the secondary radar device, wherein a certain time will elapse between the sweeping of a target by the radiaion lobe of the primary radar device and the occurrence of the respective echo signal at the output of the primary radar receiver.

In secondary radar devices, within the framework of the air space surveillance and flight safety, it is common to emit the interrogation signals continuously with fixed interrogation pulses. In cooperation with primary radar devices, it is furthermore known to provide a pretrigger and to assure thereby that the answers from a transponder and the echo signals of the primary radar device are available for processing approximately at the same time ("Secondary Radar" by P. Honold, Pages 35, 36). The antenna of both sytems are always aligned in the same way and the interrogation signals are emitted independently of whether or not targets are hit by the primary radar arrangement. Accordingly, the radio room load may be increased to an undesired extent. Because of the different ranges of the primary radar device and secondary radar device, answer signals are caused by targets which are not being interrogated. This leads to an unnecessary load of the transponder and the secondary radar receiver. A flight surveillance system is known from the German Pat. No. 1,263,872 whereby a certain period of time is assigned to each airplane in such a way that each airplane receives, only during its respective period, interrogation signals and emits answer signals. Such methods lead to a considerably lower frequency of the answer signals since answers cannot be released constantly but only in sections. They have, however, the disadvantage that high precision is required to control the transponder time. The number of interrogation signals and thus the radio room load remains unchanged.

The present invention utilizes secondary radar devices in cooperation with primary radar devices to keep the radio room load as small as possible and to secure rapid target interrogation in the required scope. According to the invention which refers to a radar arrangement of the initially mentioned type, this is achieved in that the main radiation direction of the antenna assigned to the secondary radar device is displaced with respect to the main radiation direction of the antenna assigned to the primary radar device by an angle of such value which is in a direction opposed to the movement of the radiation lobes that the angular change which occurred during the processing time is compensated for. Echo signal interrogation signals released from the secondary radar transmitter are emitted in the direction of the target covered by the primary radar device. In very fast rotating primary and secondary radar antennas as well as in case of very small and narrow antenna lobes, needed target interrogations can be achieved without continuously radiating interrogation signals in directions where targets do not exist. The radio room load can thus be kept small. The present invention is especially important in all around search apparatus for surveillance of the air space. Such devices can be used aside from the flight safety functions and preferentially for the surveillance of the air space for purposes of friend-foe identification.

Due to the fact that the secondary radar antenna is displaced contrary to the direction of antenna rotation direction by an angle corresponding to the processing time in the initial coverage of a target (also naturally during the further pursuing of this target), interrogation signal can be immediately directed to the target. Identification of the target by the interrogation signals thus begins immediately after the target coverage except for the time of processing by the primary radar device.

The invention can be used preferentially in connection with integrated antenna arrangements of the type shown in the German Offenlegungsschrift No. 2,139,216. Referring to the drawings in greater detail, in FIG. 1, a reference direction, for instance the direction North, of a surveillance area is denoted with N, and the antenna lobe of a primary radar device is designated PK. The antenna lobe of the secondary radar device pointing in the same direction is formed by two partially overlapping radiation lobes SK1 and SK2. Thus very small interrogation areas can be realized for the secondary radar device so that only in a certain angular area are answer signals released. Closer details of these known possibilities of the use of narrow interrogation lobes are described in the book of P. Honold "Secondary Radar", Pages 52 and 53. In such arrangements, the technique of the monopulse antenna is applied. In case of the radiation lobes PK, SK1, SK2 the center axis MA shows the azimuth angle $\phi 2$ which is for instance, referred to north, N. A rotary direction which is counter clock-wise is assumed. Aside from preferred rotating radiation diagrams shown in the invention, the scanning of sector-shaped areas can be used.

In a position which was assumed at a prior point in time (dash-like radiation lobes PK', SK1', SK2') the center axis MA' of the radiation lobes points in the direction of the angle $\phi 1$. If it is assumed that in this direction of the aximuth angle $\phi 1$ a target, for instance an airplane, which has newly entered the surveillance space has appeared, the primary radar device will require a certain time (processing time) until the received echo signals lead to target indication. Above all the oscillation time of double filters of the primary radar device as well as the time required for the exceeding of certain threshold values are included in this time. This processing time can be determined for each primary radar device, and we are dealing herewith a systematically determined value.

Let us assume in the following example that the radiation lobes Pk, SK1 and SK2 of the primary radar and secondary radar antenna already point in the direction $\phi 2$ if the target Z from the azimuth position $\phi 1$ is recognized as such. If during this alignment of the radiation lobes SK1 and SK2 interrogation signals are emitted they would not be accepted by the target Z because of the little width of SK1 and SK2 and could therefore not release answer signals. The interrogation signals would practically have to be continued over the entire rotation area until during the next target coverage answer signals would be released. This would have the result that a superfluous radio room load would occur if only one or a few targets are to be interrogated. This enlarged radio space load leads in some further remote answer devices to unnecessary answer signals, for instance to an overload and offers to the opponent the possibility of listening to its own interrogations over long periods of time.

Between the processing time of the primary radar devide $\Delta t$ up to a safe target indication, and the angle change $\Delta \phi$ occurring in the meantime in case of a rotation period of T of the antenna lobes, the relation $\Delta t = \Delta \phi \cdot T/360°$ will result.

Figure 2:
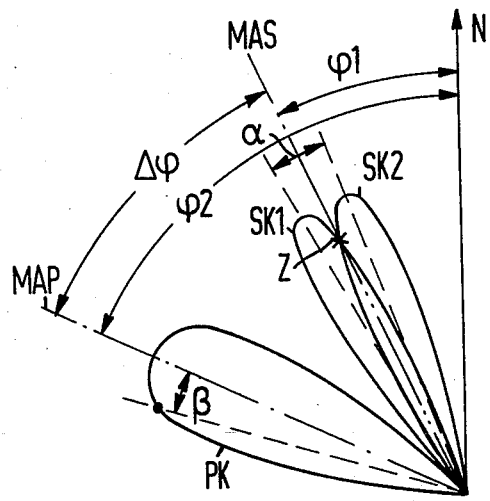
FIG. 2 shows the radiation diagrams for the primary and secondary radar devices according to the present invention indicating the displacement therebetween.

In case of alignment of the main radiation direction according to FIG. 2, the difficulties described in connection with FIG. 1 are avoided. The alignment of the radiation lobe PK for the primary radar is unchanged and points in the direction of the center axis MAP. The alignment of the radiation lobe for the secondary radar interrogation (center axis MAS) is, however, displaced by the angle $\Delta \phi$ opposed to the rotary direction of the antenna arrangement. Consequently, it points exactly in the direction of the target Z. If thus a target has been covered by the radiation lobe PK of the primary radar device in the position $\phi 1$ according to FIG. 1 and the processing time $\Delta t$ $\Delta \phi$ has elapsed, the radiation lobe SK1, Sk2 of the secondary radar device is directly onto the target Z at the moment at which the target Z occurs for the first time at the output of the primary radar receiver, and can thus be used for interrogation release of the secondary radar transmitter. In FIGS. 1 and 2, the summation diagram which always exists during such summation-difference radiation diagrams is not illustrated in order to maintain the clarity of these figures. The summation diagram would have its maximum pointing in the direction MAS.

Figure 3:
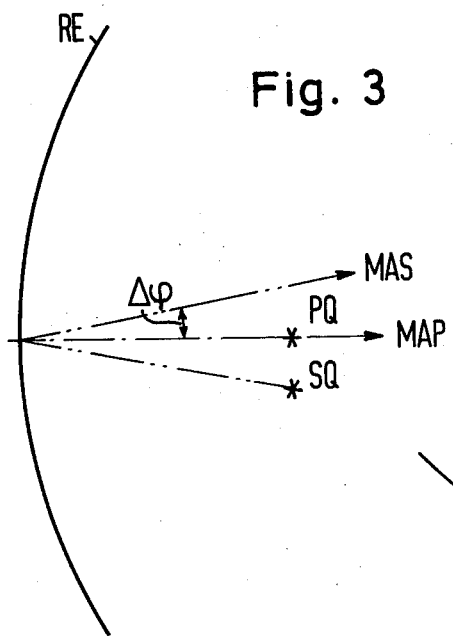
FIG. 3 shows a schematic illustration of an exciter system for a radiation diagram according to FIG. 2.

An example of an antenna arrangement designed for the achievement of a radiation diagram according to FIG. 2 is shown in FIG. 3. There (in the horizonal section) in front of a refelctor RE the radiation maximum points are shown as PQ for the radiation lobe PK of the primary radar device; SQ for the radiation lobes SK1; and SK2 of a secondary radar device. With respect to the parabolic reflector, RE the two radiation lines PQ and SQ are arranged in a displaced manner in such a way that the main radiation direction resulting after the reflection at the reflector for the primary radar device, coincides for instance with the center axis of the reflector system and points in the direction MAP. The center axis MAS of the radiation system for the secondary radar device is displaced by an azimuth angle corresponding to $\Delta \phi$ according to FIGS. 1 and 2 so that the configuration of the radiation lobes is created similar to that of FIG. 2.

Figure 4:
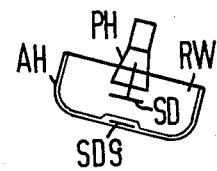
FIG. 4 shows a spatial struction of an antenna arrangement according to FIG. 3.

In FIG. 4, the antenna arrangement according to FIG. 3 is illustrated in an elevation section. Thereby, instead of the radiation sources PQ and SQ, an actual embodiment of the exciter system is shown. This exciter which is arranged in front of the reflector RE, being bent for the achievement of a certain radiation diagram, consists for the primary radar device of a horn radiator Ph and for the secondary radar device of a dipole arrangement SD. The exciter system is protected from the weather by a cover AH consisting of insulating material. Into this cover, passive secondary radiators SDS, for instance dipoles for the creation of a radiation diagram of the secondary radar antenna, can be inserted.

In the frontal view of the exciter system according to FIG. 5 and the top view according to FIG. 6, it can be observed that the entire radiation arrangement is protected at the back by a plane reflector wall RW, which can, for instance, be formed by wires inserted into an insulation plate. A larger opening is provided in this reflector wall into which the horn radiator PH for the primary radar device is placed. This horn radiator extends so far that the radiation sources PQ of the horn radiator and SQ of the secondary radar dipole arrangement are located at the same distance in front of the reflector wall RW. The three dipoles SD1 to SD3 for the formation of the secondary radar radiation diagram, SK1 and SK2, are polarized vertically and are attached via supports HS at the reflector wall RW. We are thus dealing with an integrated antenna arrangement. The supports HS also serve as feed lines which can take place in a simple way in that the supports are designed to be tube-like and in that the transmission lines are conducted interiorly of these tubes.

The summation diagram is reflected via the radiator SD2 whereby the coupling element SDS serves to sharpen the directional characteristic of the main lobe. The details of the creation of such summation and difference diagrams are known, for instance from the book by Honold "Secondary Radar", pages 49 to 54. They preferably operate according to the monopulse principle and result in a very narrow effective interrogation area, and, aside from a high azimuth angle, result in a lesser radio room load and fewer undesired answer signals of targets which are not desired to be interrogated.

By means of the two dipoles, SD1 and SD3, the difference diagram of the two radiation lobes, SK1 and SK2, according to FIG. 2 is created. Both dipoles, SD1 and SD3, are interconnected via a ring hybrid RH, one output of which is closed off by a terminating resistance RA. At the clamp, referred to by Δ, a transmission signal is fed. In case of 3 pulse ISLS (ISLS — interrogation Path Side Lobe Surpression) this is the P2 pulse, while the P1, P3 pulse is emitted via the radiator SD2 (Σ input). For the design of the radiator arrangement for the secondary radar there are several possibilities:

a. Two radiators are used with an unsymmetrically arranged horn radiator PH. Both radiators are switched together via a ring hybrid, one input of which is fed Δ and the other output receives Σ. An example is illustrated in FIG. 5 of the German Offenlegungsschrift No. 2,139,216. In this case, little material is required since only two radiators and one ring hybrid are used.

b. As illustrated in FIGS. 5 and 6 three radiators, SD1, SD2, SD3, and one ring hybrid RH are used. Thereby in most cases a sufficiently satisfactory Σ diagram and always a satisfactory Δ diagram can be achieved, whereby one ring hybrid RH is sufficient.

c. Two radiators are used for the formation of the Δ diagram and two radiators for the formation of the Σ diagram, whereby each of these radiator pairs is provided with one ring hybrid. An example is given in FIG. 6 of the German Offenlegungsschrift No. 2,139,216. Hereby both diagrams can be optimized.

Instead of the ISLS method, also the RSLS method can be used in the framework of the invention (RSLS — Reply Past Side Lobe Surpression).

In the block diagram according to FIG. 7 the all around search antenna arrangement is provided with references taken from FIGS. 3 to 6. Via a high frequency feed Line LS, a secondary radar transmitter SRS and a primary radar transmitter PRS is connected in the antenna arrangement. In addition, a secondary radar receiver SRE and a primary radar receiver PRE are coupled to the high frequency feed line. Details of the transmission of the signals from the transmitter to the antenna and the receiving signals from the antenna to the receiver are known and are for this reason not further explained.

The output signals supplied from the primary radar receiver PRE and from the secondary radar receiver SRE reach in a known manner an evaluation or indication device which is illustrated here as screen BS. Furthermore a part of the echo signals from a moving target PZE (MTI — video) of a target reach from the output of the primary radar receiver PRE to the secondary radar transmitter SRS. This target echo signal occurs if the radiation lobe PK points into the direction $\phi$ 2 and the radiation lobe SK1, SK2 into the direction $\phi$ 1. At this moment, the secondary radar transmitter SRS is scanned and transmits interrogation signals. Since normally with one single interrogation, a sufficiently safe identification of an answer device is not yet possible several answer signals have to be released in a certain pulse sequence by corresponding interrogation signals. For this purpose preferably in the radar transmitter an interrogation program may be provided in such a way that during the occurrence of a target echo signal (preferably a moving target echo signal) PZE a predetermined number of for instance ten interrogation signals are transmitted one after the other. The angle area in which interrogation signals are transmitted starts at a point preferably somewhat prior to the actual target Z and ends somewhat after the target Z. In FIG. 2 such an angular region, which is located symmetrical to the target Z, is shown and its width is denoted by $\alpha$. When considering this the main radiation axis of the secondary radar radiation lobe should be located during the coverage of the target Z (MTI - video at the output of the primary radar receiver PRE) not at $\phi$ 1 but at $\phi$ 1 $- \alpha/2$. The corrected value of $\Delta\phi$ would consequently have to be increased to $\Delta\phi = \Delta\phi + \alpha/2$. By this measure the main maximum of the interrogation lobe has not yet been achieved if the interrogation commences and the interrogations are only terminated if the main maximum has covered the target.

In an analogous manner it also has to be considered that in wider primary radar radiation lobes, PK, the target coverage by means of an output signal of the primary radar receiver PRE (MTI video signal) can already have taken place prior to the scanning of the target by the main radiation device MAP. The angle $\Delta\phi$ which is referred to the main radiation direction would then be too large and would have to be corrected to $\Delta\phi^* = \Delta\phi - \beta$. The angle $\beta$ is indicated in FIG. 2 on the left of the main radiation direction.

Such consideration, however, only have to be made if the effective width of the secondary radar antenna lobe is very small, and if the antenna arrangement is rotated very quickly. In case of wider antenna lobes these considerations are not that significant. The duration of the interrogation depends on how many answers have to be presumed within the scope of the required answer probability.

Instead of the sample embodiments illustrated in the FIGS. 3 to 6 wherein by means of a mechanical displacement of the radiator elements the alignment of the secondary radar radiation lobe was achieved can, according to a preferred further development o the invention, also take place in that during the use of several individual radiators, a switching takes place in such a way that the resulting radiation strong point, with respect to the radiation strong point for primary radar device is more or less shifted also if necessary towards either side. Thereby different rotation speeds and also different rotation directions can be considered. Details in this respect are explained in FIGS. 8 and 9.

In FIG. 8, four radiators SD1 to SD4 are illustrated whereby SD1 and SD2 are connected with a ring hybrid RH1, and SD3 and SD4 with a ring hybrid RH2. If the radiator pair SD1, SD2 are fed, the radiation strong point will be located at SQ1; if SD3 and SD4 are fed the radiation strong point is located at SQ3. In both cases different distances to the radiation strong point PQ of the horn radiator PH will depend on the position of the switch SCH and thus different values for Δ. Thereby, for instance, different rotation speeds can be taken into consideration.

It can also be advisable to design and feed the radiation arrangement for the secondary radar device as a summation-difference antenna, preferably as monopulse antenna. This is of importance if by means of a very slowly rotating antenna very quickly flying targets are to be covered.

The invention could preferably be used in cooperation with fire control radar devices whereby quick and safe target identification is especially important. The primary radar device can give the azimuth information to the fire control radar device. It is, however, also possible to design the primary radar device as a fire control radar device. In this way, sector scanning in both planes (horizontal and vertial) can occur. During back and forth movement, the reference of Δ is to be changed, as explained in FIG. 9.

In FIG. 9, the radiators SD1 and SD2 are arranged on the left, and the radiators SD3 and SD4 on the right of the horn radiator PH. If the switch SCH is adjusted to 1, the radiation strong point SQ1 will result; if the switch SCH is adjusted to 3 the radiation strong point SQ3 will result. The respective angles Δ have different directions and thereby any problems associated with radiation lobes which move back and forth can be eliminated.

We claim:

1. A radar system comprisig: a primary radar with an antenna device for generating a moving primary radiation lobe having an axis along a first line, a secondary radar with an antenna device for generating a moving secondary radiation lobe having an axis along a second different line, a primary radar receiver for receiving echo signals from a target, said echo signals being coupled to a target indicating device after a given processing time interval for producing a target indication signal, said second line being displaced from said first line in an angular direction oppossed to the angular movement of the radiation lobe of said primary radar antenna device by an angle predetermined by the length of said time interval and the speed of angular movement of said antenna lobes, means coupling the echo signals to the secondary radar transmitter, thus compensating the movement of said primary radiation lobe during said given processing time interval, whereby interrogation signals triggered from said secondary radar transmitter by the echo signals of the primary radar receiver after said predetermined processing time are directly and immediately radiated to the target which generated said echo.

2. A radar system in accordance with claim 1, wherein the primmary and secondary devices have a common reflector.

3. A radar system in accordance with claim 1, wherein the antenna arrangement for the secondary radar device has a relatively narrow radiation lobe and hence narrow interrogation width.

4. A radar system in accordance with claim 1, wherein the radiator arrangement for the secondary radar device is designed and fed as a sum and difference antenna.

5. A radar system in accordance with claim 1, wherein the secondary radar device has means for forming two radiation lobes, said means comprising two separate radiators and a common ring hybrid for feeding both of said separate radiators.

6. A radar system in accordance with claim 1, wherein the secondary radar device has three radiators comprising; a center radiator creating a summation radiation lobe, and two outer radiators creating the diference radiation lobes, the two outer radiators being connected to a ring hybrid for being commonly fed thereby.

7. A radar system in accordance with claim 1, wherein the secondary radar device has four radiators comprising two pairs and a ring hybrid associated with each pair such that one pair creates the summation lobe and the other pair creates the difference lobes.

8. A radar system in accordane with claim 1 whrein said secondary radar transmitter has means for transmitting a prescribed number of interrogation signals in sequence therefrom in response to a target echo received by said primary radar receiver.

9. A radar system in accordance with claim 1, wherein the displacement angle is accomplished by switching feed lines of the secondary radiation device.

10. A radar system in accordance with claim 9, wherein an angle displacement of different magnitudes is accomplished by said switching of the feedlines.

11. A radar system in accordance with claim 9, wherein the angle displacement is accomplished in different directions with respect to the primary radiation lobe.

* * * * *